July 23, 1968 G. DANNER 3,394,032
ELECTRIC FUEL CELLS HAVING CORRUGATED SEPARATING MEANS
Filed May 14, 1964
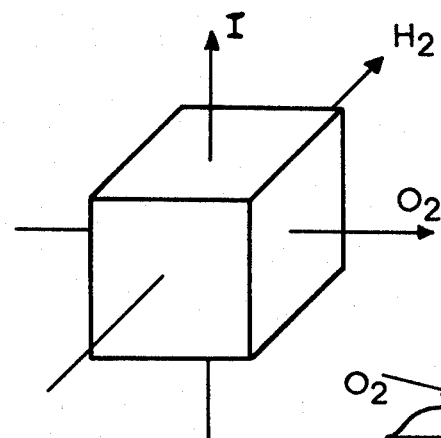
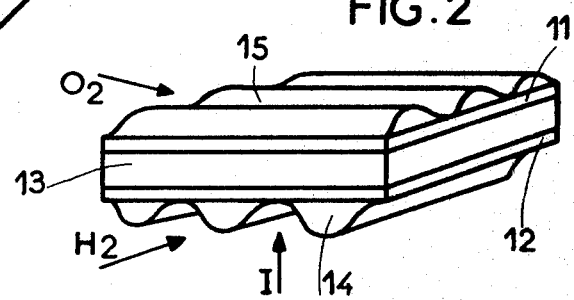
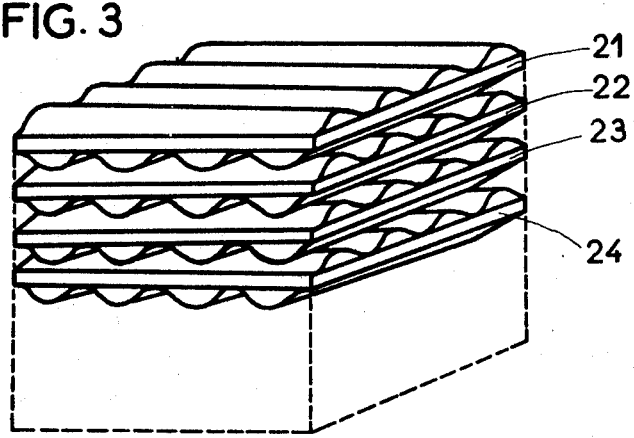
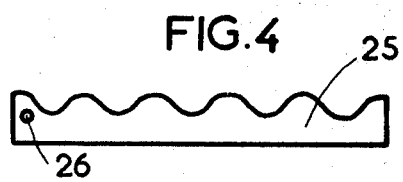
INVENTOR
GEORGES DANNER
BY Paul M. Craig Jr
ATTORNEY

United States Patent Office 3,394,032
Patented July 23, 1968

3,394,032
ELECTRIC FUEL CELLS HAVING CORRUGATED SEPARATING MEANS
Georges Danner, 11 Blvd. Davout, Paris, France
Filed May 14, 1964, Ser. No. 367,457
Claims priority, application France, May 17, 1963,
935,255
6 Claims. (Cl. 136—86)

ABSTRACT OF THE DISCLOSURE

An electric fuel cell comprising a plurality of fuel cell elements stacked in a substantial parallel relationship to each other, each of the fuel cell elements including two flat, porous electrodes spaced in a substantially parallel relationship about an electrolytic medium and corrugated separators disposed between each adjacent pair of fuel cell elements. The corrugated separators are arranged so that the corrugations thereof contacting the surface of the electrodes of each fuel cell element define a series of channels which serve to conduct fuel to one of the elements and oxidizing agent to the other. Additionally, the separators are provided with internal channels.

---

This invention relates generally to fuel cells and more particularly to elementary cells or cell elements comprising two electrodes and an electrolyte, and to electric piles made by the juxtaposition of several elements identical or not.

It is known that in fuel cells each electrode must be fed with a different gas, the gas has to be fed to the electrode by a pipe and possibly has to leave by another pipe. Moreover, the electric current must be collected on the electrodes and, in most cases, it is necessary to make a heat transfer fluid flow through the cell either for heating or cooling. As a result, one must arrange in the immediate vicinity of the cell a large number of miscellaneous pipes. If several cell elements must be assembled in order to obtain a higher voltage, the pipework essential to the operation of the pile makes access difficult for maintenance and raises pipework lay-out problems, the solution of which is complex and often costly.

It is therefore an object of this invention to provide a cell element and an electric pile made of such elements the feeding of which by the various fluids being particularly simple, compact and of economic construction.

There already exist fuel cells in which the supply gases of both electrodes flow along two generally straight paths, the paths of the gases being fairly perpendicular to each other and in which the electric current flows through the cell element following a direction fairly perpendicular to the two directions of the gas stream; it is, of course, understood that "fairly perpendicular" arrangements may include arrangements in which the directions of three fluids, the electric current and the two gases, are sufficiently distinct for allowing in practice the connections to be grouped, not imbricated, and angularly distributed in space.

One adopts generally the most convenient arrangement, with due consideration to various conditions which may be otherwise specified. The disposition according to which the three above-mentioned directions are perpendicular to one another and form a trirectangle trihedron seems however to be the most advantageous one.

It results from this that the directions of the gas streams pratically determine the direction of a plane and in general the electrodes are plane and parallel one to the other, the electrolyte being disposed in a layer of a generally flat shape between the electrodes. The electric pile elements thus arranged have therefore a generally flat shape.

The electric current, flowing from one electrode to the other, crosses the element according to a general direction fairly perpendicular to the mid plane or the cell element. Means are provided for ensuring the flow of the two fuel gases, one on either side of the cell element, in palnes parallel to the electrodes, in distinct and preferably fairly perpendicular directions. In particular, it is a known method to use between two elements of an electric pile an intermediate element, a separator or the like having one each of its two faces, channels, grooves, ribs, or the like, fairly perpendicular in direction and emerging on the sides.

According to the present invention, said intermediate element is hollow, so as to provide an inner space.

In one embodiment, the above-mentioned separator is made of two corrugated sheets placed side by side, the corrugations being an angle.

According to the present invention, it is possible to make a fluid flow in the space between the two above-mentioned corrugated sheets, for instance to enable heat exchanges such as heating or cooling of the pile.

The space between the two sheets may also be filled with a gas-tight material, if necessary heat-resistant, particularly if the cell operates at high temperature and, preferably, electricity conductive; said space between the two sheets may as well be closed by plates, plugs or the like of appropriate shapes, disposed around the pile, or may be sealed by deformation and/or cutting of one of the sheets near the edge, by stamping for example, the sheets being welded if necessary.

In a pile according to the invention, the electric current flows perpendicularly to the two gas streams, and one has a good distribution of the electric current densities on the whole of the pile. Collecting the current, which usually raises serious problems, is very simple here.

The present invention applies advantageously but not exclusively to fuel cells using a solid electrolyte. A solid electrolyte is, in effect, advantageous for making cell elements of generally flat shape. It can be formed into lamellae, strips, pellets or the like. For instance, one may use zirconium oxide, with formula $ZrO_2$.

One may also use a refractory impregnated with a liquid electrolyte or an electrolyte which is liquid at room temperature as well as at high temperature.

Other charatceristics of the present invention will become apparent from the following description:

On the accompanying drawings:

FIGURE 1 shows schematically the flow directions of the fluids flowing through a cell;

FIGURE 2 shows in a simplified perspective a cell element according to the invention;

FIGURE 3 shows an electric pile made of a certain number of elements of the type of FIGURE 2; and FIGURE 4 is a plan view of a component of the pile of FIGURE 3.

FIGURE 1 shows schematically the cell type to which the present invention applies. In the case of a cell the electrodes of which are supplied respectively with hydrogen and oxygen, the cell has been shown as a cube, the three main axes of which are swept respectively by the fluids, the flow of which is inherent to the very pile operation, i.e.:

The electric current flows along the vertical axis I on the figure; oxygen flows along the axis indicated $O_2$ from left to right, and hydrogen flows on the axis $H_2$ from front to back with respect to the plane of the figure. By making spatially distinct the three directions of flow of the fluids which concur to the pile operation, the arrangement of the electric current or gas supplies around the operating cell is made easier.

FIGURE 2 illustrates an embodiment of a pile element according to the present invention. The element is advantageously rectangular in plan view, the lengths of the sides being selected according to the exchange rates of the gases with the electrodes, which depends on the nature of the gases and on the nature of the electrodes, on the thickness and on the state of the material of the latter, etc. The cell element may be square-shaped if conditions are similar for the two electrodes of the pile.

The two electrodes 11 and 12 are made of large or small plates, sheets or the like, of a suitable metal, eventually porous, selected according to the nature of the gases used in the cell operation, and according to the nature of the electrolyte. In one embodiment, the electrolyte 13 may be solid and may be made, for instance, of zirconium oxide, or another suitable solid electrolyte. In the case of the solid electrolyte, the two electrodes are simply pressed against the electrolyte and can, if required, be welded to it. One may also conceive electrodes obtained by metallic deposition on a face of a sheet, pellet, or the like, of a solid electrolyte, a crystalline one for instance. In the case of a solid electrolyte, it is not necessary to provide for walls to contain the electrolyte on the sides. In the case of a liquid electrolyte, it is necessary to contain the liquid on all sides and also to ensure the contact between the liquid and the two electrodes. Then, if one wants to dispose the electrodes in horizontal planes, means must be provided for applying the upper electrode on the electrolyte bath surface as, if the level of the latter was to go down, the contact could be broken. The electrodes may then be arranged, for instance, as vertical plates, pairs of which making up pots in which a liquid electrolyte may be disposed, said pots being closed on their periphery by appropriate isolating walls, as it is well-known for fuel cells using a liquid electrolyte. One may also use a liquid electrolyte stored within a partitioned, cellular, porous or the like holder, made of plastics for instance, for operating at room or medium temperature, or of a refractory material for operating at high temperature.

The flow of the gases, for instance hydrogen and oxygen, along straight paths, may be achieved by providing on either face of the cell element striated, ribbed, grooved, or the like, pieces, such as corrugated sheets for instance, the corrugations being perpendicular to one another on the two faces of the cell. On FIGURE 2 are shown two perpendicularly orientated sheet elements 14 and 15. The gases are fed each on one of the sides of the cell, of generally square shape, and leave on the side opposite the entry side. The electric current is collected on the two corrugated sheets, which, along each corrugation, have a linear contact with the adjacent electrode. The gases are directed in the channels of generally straight profile bounded on one side by the electrode outer face and by the corrugated sheet surface on the other side.

On FIGURE 3 is shown an electric pile constituted by an assembly of cells of the type described on FIGURE 1. The various cells 21, 22, 23, 24, etc, which are square-shaped in plan view, are stacked one upon another, the corrugated sheets ducting a particular gas being laid parallel one to the other. One thus obtains an electric pile in the proper meaning of the word, the electromotive force of which is the sum of the electromotive forces of the different constituent elements. The assembly has the generally form of a parallelepiped, the height of which depends on the selected number of elements.

The current flows across the pile from bottom to top through the sheets and their contacts with the electrodes and between themselves, at the intersecting points of the perpendicular corrugations of adjacent sheets of different polarity, the sheets being, if desired, welded together at these points. One of the side faces of the pile is fed with one of the gases, another face perpendicular to the former is fed with the other gas. The gases flow in their channels and emerge on the faces opposite their inlet faces. Hence, one has, out of four vertical faces, two faces for the supply of reaction gases and two faces for possibly collecting the gases which have not been absorbed during their passing through, and which possibly carry with them the combustion gases or products. In the case of an arrangement such as shown on FIGURE 3, it is necessary to seal the spaces between two adjacent sheets of opposite polarity and belonging to the two distinct adjacent cells, as otherwise the gases would therein mix together and, besides the disadvantage of having a possibly explosive mixture, in the apparatus, the separation of the collected gases, on the outlet, would be made difficult. Then, one may use for this purpose flat pieces of the type shown as 25 on FIGURE 4, inserted, welded or fastened in any appropriate manner at the ends of the corrugated sheets. The utilisation of such a piece leaves empty spaces between the electrodes, and such spaces may be used, for instance, for circulating heating or cooling fluids, as the case may be, provided that appropriate pipes be connected at places which do not interfere with the pile lay-out, for instance in the vicinity of the vertical edges of the pile shown on FIGURE 3. One may thus provide an opening 26 in plate 25, for connecting a circulation pipe for a cooling or heating fluid, as the case may be. Another opening may be provided on the opposite plate or at the other end of the same plate 25. Partitions operating as baffles may be provided in the space so defined, in order to impose a satisfactory path to the fluid used. One may also fill the space between two adjacent corrugated sheets by using, as the case may be, either a filler, preferably electricity conductive, in order to facilitate the passing of the current from one pile element to the other, or, if the contact between two adjoining corrugated sheets is deemed adequate, any sort of filler, heat-resistant if necessary, such as a cement, a refractory or the like.

Naturally, the invention is by no means limited to the embodiments described or illustrated more particularly, which were only shown as examples. In particular, it is possible to conceive a triangular arrangement, two sides being used for gas supply and one side being possibly used for a thermal control fluid, for instance in the case the gases would be fully used up in the pile. One might also imagine a rectangular arrangement, the gases flowing counterflow from one longer side to the other, and the pile being possibly crossed in the longitudinal direction by a thermal control fluid, the two gases being supplied from the same pile face or from two opposite faces. Likewise, the circulation channels may be disposed fan-shaped, curve-shaped, or otherwise.

What I claim is:

1. An electric fuel cell, comprising,
   a plurality of fuel cell elements stacked in a substantially parallel relationship to each other, each of said fuel cell elements including two flat, porous electrodes, said electrodes disposed in spaced, substantially parallel relationship, and an electrolytic medium disposed between said electrodes,
   and corrugated separating means disposed between each adjacent pair of said fuel cell elements, said corrugated separating means comprising a plurality of contiguous corrugated sheets, each being conductive and impervious and defining a series of channels between a single sheet and an electrode of each fuel cell element, said channels serving to conduct fuel to one of said fuel cell elements and oxidizing agent to the other of said elements, said plurality of corrugated sheets defining therebetween internal channels, and inlet means and outlet means to allow circulation of fluid through said internal channels.

2. An electric fuel cell according to claim 1 wherein said corrugated separating means comprises two juxtaposed corrugated sheets, said sheets being oriented such that the corrugations are arranged at substantially right angles, thus defining a series of internal channels between said sheets.

3. An electric fuel cell according to claim 2 wherein said internal channels between the two sheets are closed at two opposite sides of said fuel cell by plates or plugs of appropriate shape.

4. An electric fuel cell according to claim 3 wherein said internal channels between the sheets are laterally closed by forming and cutting of one of the sheets in the vicinity of its edge, and subsequently welding the formed edge of one sheet to the other sheet.

5. An electric fuel cell according to claim 3 wherein said internal channels contain a circulating fluid, whereby heating and cooling of the fuel cell are effected.

6. An electric fuel cell according to claim 3 wherein said internal channels are filled with a material which is gas-tight, heat-resistant and electricity conductive.

References Cited

UNITED STATES PATENTS

| | | | |
|---|---|---|---|
| 2,276,188 | 3/1942 | Greger | 136—86 |
| 3,188,242 | 6/1965 | Kordesch et al. | 136—86 |
| 3,012,086 | 12/1961 | Vahldieck | 136—86 |

WINSTON A. DOUGLAS, *Primary Examiner.*

H. FEELEY, *Assistant Examiner.*